United States Patent [19]

Chominski

[11] Patent Number: 5,020,110

[45] Date of Patent: May 28, 1991

[54] ARRANGEMENT FOR CHECKING DOCUMENTS

[75] Inventor: Pawel Chominski, Huddinge, Sweden

[73] Assignee: Inter Innovation AB, Stockholm, Sweden

[21] Appl. No.: 301,012

[22] Filed: Jan. 24, 1989

[30] Foreign Application Priority Data

Feb. 17, 1988 [SE] Sweden ................................ 8800542

[51] Int. Cl.$^5$ ............................................. G06K 9/00

[52] U.S. Cl. ..................................... 382/7; 340/825.3; 382/34

[58] Field of Search .................. 382/7, 34, 33, 27, 50, 382/30; 356/71; 209/534; 340/825.3, 825.33, 825.34; 235/379; 194/206, 207, 212

[56] References Cited

U.S. PATENT DOCUMENTS

| | | | |
|---|---|---|---|
| 4,041,456 | 8/1977 | Ott et al. | 382/7 |
| 4,179,685 | 12/1979 | O'Maley | 382/7 |
| 4,326,258 | 4/1982 | de la Guardia | 382/7 |
| 4,464,786 | 8/1984 | Nishito et al. | 382/7 |
| 4,464,787 | 8/1984 | Fish et al. | 382/7 |
| 4,550,433 | 10/1985 | Takahashi | 382/7 |
| 4,823,393 | 4/1989 | Kawakami | 382/7 |

*Primary Examiner*—David K. Moore
*Assistant Examiner*—Joseph Mancuso
*Attorney, Agent, or Firm*—Simmons, Perrine, Albright & Ellwood

[57] ABSTRACT

An arrangement for checking or examining bank-notes or similar documents include a detector, such as a CCD array of, for example, 256 photocell devices. The documents are scanned by the photocell devices transversely of their longitudinal extent. The signals are digitized by an analogue/digital converter (2), such that the output of each photocell device is represented only by one digital bit. The analogue/digital converter (2) further defines horizontal and vertical edges of the documents and of printed images thereon, and passes the digitized signals including that of the defined edges to a position detector (6) and to a memory (4). The position detector (6) delimits the signals digitized by the analog/digital converter (2) and filtered by a filter (3) by admitting into the memory (4) for storage sixty four picture elements of selected document information with respect to vertical and horizontal outer edges as a window of 64 by 64 picture elements. A side detector (8) is coupled to and receive scanned information from the position detector (6) makes a preliminary determination as to the denomination of the document and as to which side of the document has been read. This preliminary determination is applied to the decision circuit to improve the security, of the decision based on a comparison of the window stored in the memory (4). The stored window in the memory (4) is compared, bit by bit, to reference information stored in a reference memory (5). Differences in the compared data are weighted, counted and presented to a decision circuit (13). The delimiting of information for comparison to preselected significant sections of the document based on edge detection, and a preliminary denomination and side detection in combination with comparison exhibit a high degree of security with regard to "error decision" in the control signal.

9 Claims, 1 Drawing Sheet

ARRANGEMENT FOR CHECKING DOCUMENTS

TECHNICAL FIELD

The present invention relates to an arrangement for checking or examining documents, such as bank-notes, checks, vouchers and like documents.

More specifically, but not exclusively, the invention relates to an arrangement of the kind which includes detector means operative in scanning the documents one at a time as the documents pass the detector means, and signal processing circuits operative in processing the output signals from the detector means, comparing the thus processed signals, hereinafter referred to as the document signals, with a corresponding signal produced from a reference document applicable to the type of document being examined or checked and in producing a control signal in response to the results of the comparison made between the document signal and the reference signal.

BACKGROUND PRIOR ART

The known state of the art includes arrangements for checking documents, by passing light simultaneously through an original or master and a document, where the original is sensitive to light and is intended to emit respectively an intensity maximum and an intensity minimum for the light energy derived from a light source and passing through the documents and the original. An example of one such arrangement is disclosed in Swedish Patent Specification 353 807.

Also known to the art are document checking arrangements which incorporate thickness measuring devices which are operative in measuring continuously thicknesses within an area whose form corresponds to the form of given parts of the document having a thickness different to remaining document parts. An example of one such arrangement is disclosed in Swedish Patent Specification 355 428.

These and similar document checking arrangements have, in some cases, been found much too expensive in manufacture and in operation to be used successfully in large numbers, for instance in conventional automatic cash dispensers.

SUMMARY OF THE INVENTION The object of the present invention is to provide an arrangement for checking bank-notes, checks, etc., which can be constructed to a large extent from standard components, thereby rendering the arrangement inexpensive with regard to its manufacture and operation. Another object is to provide such an inexpensive arrangement where the risk of a "checking error" will not be greater than the risk factor encountered with the more expensive prior art document checking arrangements, and which will not make it necessary to slow down the speed at which said documents are checked and handled.

These objects are achieved with a document checking arrangement of the aforesaid kind which includes detector means and signal processing circuits and which, in accordance with the invention, further include an analogue/digital converter which is operative in digitizing a signal representing a plurality of picture elements for each scan and which is intended to effect said digitizing process with solely one digital bit for each picture element, which although in itself implies an approximation has been found fully acceptable; a position detector which is operative in delimiting the scan to document areas or parts of particular informative interest; and circuits which are operative in filtering-out from the signal obtained from the signal processing means those parts of the signal which can be considered highly unlikely to have any informative significance, this filtering process being carried out both upstream and downstream of a reference signal comparison circuit.

Other characteristic features of the inventive document checking arrangement are set forth in the following claims.

BRIEF DESCRIPTION OF THE DRAWINGS

The invention will now be described in more detail with reference to the accompanying schematic drawings, in which.

DESCRIPTION OF PREFERRED EMBODIMENTS

Figure 1:
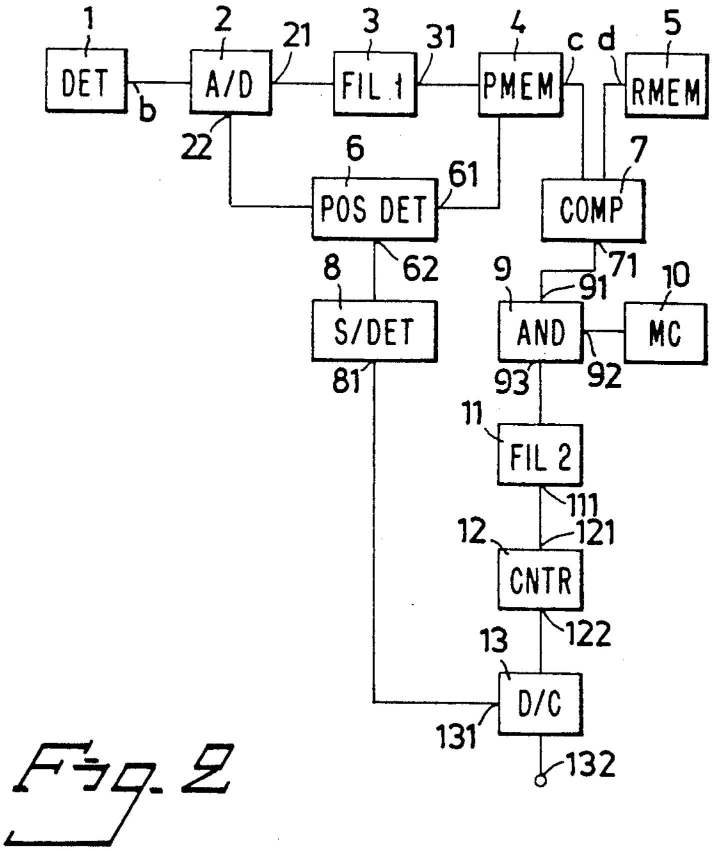
FIG. 1 is a block schematic which illustrates an arrangement according to the invention.

The arrangement illustrated in FIG. 1 includes detector means 1 (DET) for scanning documents, e.g. bank-notes, and signal processing circuits 2–13 intended for processing the output signal from the detector 1, comparing the thus processed signal, hereinafter referred to as the document signal, with a corresponding reference signal produced from a reference document applicable to the type of document being checked, in this case bank-notes, and for producing a control signal in response to the result of the comparison made between the document signal and the reference signal.

The detector means 1 may comprise, for instance, a so-called "CCD Array", i.e. a row of, e.g., 256 photocell devices which scan in series a bank-note transversely of its longitudinal extension as the bank-note passes the detector means, said bank-note passing said means in the direction of its longitudinal extension and at a speed of about 2.5 m/sec. In response to this scan there is produced an analogue signal which is processed and evaluated in the subsequent processing and evaluating devices.

These signal processing devices include, inter alia; an analogue/digital converter 2 ("A/D") for digitizing the detector means output signal to a digital signal which represents a plurality of picture elements (in this case 256 picture elements) for each scan, this digitized process being effected with one, and only one, digital bit per picture element;

a comparison circuit 7 ("Comp") which is located on the output side of the analogue/digital converter 2 and the position detector 6 ("POS DET") and which is operative in effecting said comparison between the document signal, i.e. the digitized and delimited signal, and the reference signal; and a weighting circuit 9–10 ("AND" and "MC", respectively) which is located on the output side of the comparison circuit 7 and which is operative in weighting parts of a comparison circuit output signal in order to determine whether or not respective parts of the output signal have a particular informative significance with respect to the relevant document (i.e. bank-notes) and should therewith be included in the control signal delivered from the output side of the arrangement.

More specifically, the analogue/digital converter 2 comprises a circuit for establishing transitions from white to black and black to white, whereby it is possible to define horizontal and vertical outer edges of both the bank-note itself and of the printed images, pictures or signs found on the bank-note. Establishment of these transients is based on the transition colour gradients, which thus determine whether a picture element (small part of the bank-note) is white or black; thus there is no form of intermediate such as a grey-scale and the signal on the output side, 21 or 22, of the converter 2 is thus composed of parts having one, and only one, digital bit for each picture element. Practical tests have shown that this represents a fully acceptable approximation of the true conditions and enables the subsequent processing of signals and the construction of circuits to be greatly simplified This applies in particular to the demands on hardware in a downstream filter 3 ("FIL") and on the memory capacity of a downstream picture memory 4 ("PMEM") and reference memory 5 ("RMEM"). Despite its simplified construction, the arrangement is very fast and enables documents to be handled at a speed of, e.g., about 10 bank-notes per second.

The output 21 of the analogue/digital converter 2 is connected to the filter 3, which is operative in filtering-off information which has insufficient extension in the longitudinal or transversal direction of the bank-note. Consequently, the checking process is concentrated on the important (large) parts of the printed pictures or images on the bank-note, while eliminating information which is probably of no interest in the present context, for instance the presence of narrow pencil marks on the bank-note, etc. This elimination of non-significant markings is achieved by comparing a picture element signal part with surrounding picture element signal parts continuously during a signal processing operation. When the character of the picture element is found to differ from the character of the surrounding picture elements taken as a whole, it is highly probable that this picture element can be (should be) ignored in the following checking process. Thus, "errors" encountered in the document signal during the signal processing procedure are filtered-out in the filter 3, this filter being referred in the following claims as a "further filter".

The output 31 of the filter 3 is connected to the memory 4, in which the document (bank-note) signal is stored for later comparison with the reference signal taken from the reference memory 5.

The output 22 of the analogue/digital converter 2 is connected to the position detector 6, the output 61 of which is connected to a control input on the memory 4. The position detector 6 is operative in selecting a section of the picture surface of a bank-note which has been empirically judged to be significant, and to control the storage of the signal from the filter 3 in the memory 4 in accordance with this selection. Thus, in operation the converter 2 is instrumental in first identifying the leading edge of the bank-note and then in identifying the defining edges of sections of an image or picture area of the bank-note, and the position detector 6 is instrumental in permitting or preventing the storage of a plurality of digitized "scans" in the memory 4 in accordance with instructions pre-stored in the detector 6.

As an example, it can be said that each "scan" will comprise 256 picture elements, so as to provide adequate tolerance for variations in size, crooked feeding and other possible variations in the presentation of the banknotes in the detector means 1 of the arrangement (transportation past said detector means). In this instance, each "scan" corresponds to the width of the bank-note at a given margin. The use of each "scan" is reduced to 64 picture elements as digitized by the converter 2, calculated from a point which is identified by the converter 2 for each separate "scan" at the commencement of the printed picture or image. In this way, the total picture surface of the bank-note (one side) is reduced to a window of 64×64 picture elements, the whole of this window being stored in the memory 4. IN the case of certain kinds of bank-notes, it is possible already at this stage to determine which side of the bank-note has just been checked, namely in the case of those bank-notes in which the size/position of the pictures printed on respective sides of the bank-note differ to such an extent that the information from the converter 2 can be utilized as a contributory criterion when the final decision—genuine/not genuine, correct/incorrect—is to be made. This decision is made in a side detector 8 ("S/DET") which is connected to the output 62 of the position detector 6 and the information from which is thus weighted in the decision logic, so as to further improve the security of the arrangement. The detector 8 is thus able to provide a preliminary assessment of the bank-note in question (its denomination), but does not alone form the basis of a decision.

The reference memory 5 contains a library of reference information concerning those pictures or images which can be expected (front and back sides in two positions) based on statistical examinations of each individual picture or image. In this case, it is necessary to evaluate the entire intended population, since the significant sections selected by the position detector 6 will always lie in the same place, irrespective of the picture or image processed. Because these examinations are based on a large and representative selection of images, there is obtained the tolerance with respect to printing and quality spread necessary for obtaining a satisfactory final result.

With reference to the example given above, it can be mentioned here that the reference memory is organized with 8 bits per memory and address, which means that each "scan" will correspond to 8 addresses. Since each window is comprised of 64 "scans", a complete window will correspond to 512 addresses each comprising 8 bits. Four such windows are required for each bank-note, since the bank-note can be turned to four different positions. The total size of the memory is thus determined by the size of the total population of pictures from which a particular type of bank-note (type of document) and its relative position can be defined.

A comparison between document signals (= picture on a bank-note) stored in the memory 4 and reference signals (= reference library) stored in the reference memory 5 is carried out in the comparison circuit 7 by reading out information bit for bit from both memories serially and simultaneously. A logic "0" is obtained on the output 71 of the comparison circuit 7 each time there is agreement (white=white, black=black) between corresponding bits in the two signals, whereas a logic "1" is obtained on said output 71 in the case of a disagreement in the comparison (="error").

The weighting circuits 9–10 include an AND-circuit 9 ("AND"), the one input 91 of which is connected to the output 71 of the comparison circuit 7 and the other input 92 of which is connected to a mask circuit 10 ("MC") which is operative in evaluating the significance of a position newly read-out, i.e. decides whether or not the value of the position concerned shall be weighted in the final result or be ignored.

If the position in question is important to the decision, a logic "1"is sent from the circuit 10, otherwise a logic "0". As a result, only position relevant "errors" (="ls") will leave the output 93 of the AND-circuit 9 and be fed to the filter 11 ("FIL2"), in which the signal is filtered in approximately the same manner as in the filter 3, thereby eliminating "errors" which are insignificant for some reason or other, to the greatest possible extent.

The arrangement also includes a counter 12 ("CNTR"), the input 121 of which is connected to the output 111 of the filter 11, and the output 122 of which counter is connected to a decision means 13 ("DC"). The number of erroneous picture elements for each reference picture is counted and presented to the decision means, which includes a processor (e.g. of the type sold under the trade name Zilog-Z-80) having a program for evaluating the results from the counter 12. The program can be configured so that if the number of "errors" f1 in respect of a bank-note which exhibits the best agreement with a given reference picture is less than a pre-determined number, and if the quotient (f2/f1) between the number of "errors" f2 exhibited by the bank-note in the next best agreement with another reference picture, and said number f1 is greater than a pre-determined second number the bank-note just checked will be accepted, otherwise not.

As before indicated, the size/position of a printed picture or image on a bank-note can form a criterion for establishing the type of bank-note concerned and its denominational value. To this end, the output 81 of the detector 8 is connected to an input 131 of the decision means 13, thereby enabling the decision means to be provided with additional information and therewith further ensuring that a correct decision will be made.

The final result, irrespective of whether it concerns denominational value, position, or some other sorting criteria, can be presented, e.g., in the form of a known ASCII-code or the like.

It will be understood that the aforedescribed exemplifying arrangement can be modified in many ways within the scope of the inventive concept, as defined in the following claims. It should also be observed that, for the sake of clarity, the FIG. 1 illustration has not been encumbered with known synchronizing devices necessary for the functional cooperation between the various units described in detail.

Figure 2:
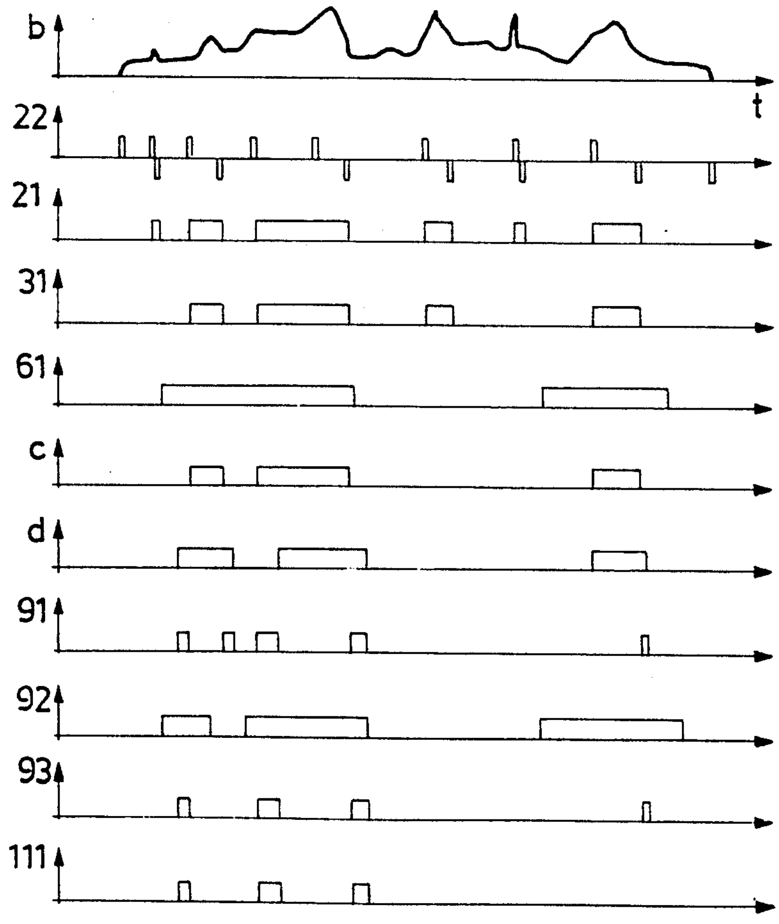
FIG. 2 is a diagrammatic illustration of signals which are relevant in connection with the arrangement illustrated in FIG. 1.

FIG. 2 is a simplified illustration of signals 22, 21 . . . 111 produced at various positions b in the block schematic of FIG. 1, these signals totalling 11 in number. This signal diagram relates to a single "scan" of the detector means 1 over a bank-note, wherein:

"b" illustrates the analogue signal leaving the detector means 1;

"22" illustrates the pulse signal sent from the analogue/-digital converter 2 to the position detector 6, this pulse signal including positive and negative pulses corresponding to the gradient values of the curve "b" at transitions from light-dark, dark-light areas;

"21" illustrates the pulse signal sent from the analogue/-digital converter 2 to the filter 3, each pulse being defined by positive and negative pulses in consecutive sequence in the pulse signal "22";

"31" illustrates the output signal from the filter 3, where certain narrow pulses in the pulse signal 21 are filtered out, namely the first and the fifth;

"61" illustrates a control signal for controlling storage of information in the memory 4;

"c" illustrates the output signal from the memory 4, this signal being the result of the input signals "31" and "61". It will be evident that the third pulse in the signal "31" is subpressed;

"d" illustrates the output signal from the reference memory 5, i.e. the signal is independent of the bank-note being analyzed at that time;

"91" illustrates the signal on the connection of the ANDcircuit 9 to the output of the comparison circuit 7, i.e. the signal signifies an "error" evidenced by the comparison made between the signals "c" and "d";

"92" illustrates the signal sent from the mask circuit 10, i.e. the signal has a certain similarity with the signal "d", in that it is independent of the bank-note undergoing analysis at that time;

"93" illustrates the result signal from the output of the AND-gate 9; it will be seen from this signal that the second pulse in the signal "91" has been eliminated; and "111" illustrates the output signal from the filter 11, where certain parts of the signal are filtered out on the basis of the result obtained from previous processing of the signal; it will be seen that the fourth pulse in the signal "93" has been eliminated.

I claim:

1. An arrangement for checking documents, such as bank-notes, checks, coupons, vouchers or like documents, comprising:

detector means operative in scanning documents, one at a time, during the transport of said documents in a longitudinal direction of the document past said means, and signal processing means operative in processing output signals from the detector means into a document signal, comparing the thus processed signal, the document signal, with a corresponding reference signal produced from a reference document applicable to the type of document being checked, and in producing a control signal in dependence on the result of the comparison made between the document signal and the reference signal, characterized in that the detector means, including a plurality of detector cells arranged in a row, is operative to scan with a plurality of scans transversely across the width of the document and the signal processing means comprise:

an analogue/digital converter (2) which is operative in digitizing the output signals from the detector means (1) and generating digital signals representing edge signals and a plurality of picture elements for each scan, each signal representing a picture element having one, and only one, digital bit per picture element;

a position detector (6) the input side of which is connected to the output side of the analogue/digital converter (2) and which is operative in delimiting the digital signals representing the picture elements to a window of preselected digital signals representing picture elements with significant information, selected with respect to horizontal and vertical edges of one of said documents, said window of stored digital signals representing said document signal for said respective one of said documents;

a comparison circuit (7) which is arranged on the output side of the analogue/digital converter (2), and the position detector (6) and which is operative in effecting said comparison between the document signal and said reference signal; and a weighting circuit (9–10) which is located on the output side of the comparison circuit (7) and which is operative in weighting parts of an output signal from the comparison circuit (7) for establishing whether or not respective parts of the output signal are of particular informative significance in respect of said document of relative kind and shall therewith be taken as a basis for the control signal delivered on the output side of the arrangement.

2. An arrangement according to claim 1, characterized in that the weighting circuit (9–10) has an output which is connected to a filter (11) for filtering-out those parts of the weighted output signal which have been established as insignificant during the signal processing operation of the weighting circuit (9–10).

3. An arrangement according to claim 2, characterized in that connected in series between the analogue/-digital converter (2) and the comparison circuit (7) is a further filter (3) which is operative in filtering-out any errors established in the document signal during the signal processing procedure, and a memory (4) coupled between said further filter (3) and the comparison circuit (7) for receiving said digital signals and coupled to the position detector (6), the position detector (6) controlling the storage of said signals received from further filter (3), said digital signals stored in said memory (4) as delimited by the position detector (6) representing said document signal.

4. An arrangement according to claim 2, characterized in that the filter (11) is connected on its output side to a series-circuit comprising a counter (12) an a decision means (13) which incorporates a processor;

and in that the counter is operative, for each reference in a reference library (5), in counting the number of deviations occurring between the document signal and the reference signal and having passed the filter (11) and the further filter (3) and in presenting the counting result to the decision means (13);

and in that the processor of said decision means (13) is operative in evaluating the counting result from the counter (12) in accordance with a pre-set program, and in producing the control signal in dependence on this evaluation.

5. An arrangement according to claim 4, characterized in that connected between the position detector (6) and the decision means (13) is a side detector (8) which is operative in sending to the decision means (13) as a preliminary decision factor a signal which is representative of a criterion of the document in question and which is produced as a result of information obtained from the analogue/digital converter (2) relating to the size/position of a printed picture or image on said document.

6. An arrangement for checking bank notes, wherein the bank notes are passed, one at a time, in the direction of their longitudinal extent past an array of detectors arranged in a row, said detectors producing analog signals in response to images detected, the arrangement comprising:

means, coupled to the detectors, for converting said analog signals into digital signals, each digital signal represented by a single bit of information and being indicative of edges of a detected bank note and of a plurality of picture elements representative of the detected bank note;

a first memory for storing said digital signals coupled to an output of said converting means for receiving said digital signals;

position detector means, coupled to the converting means and to said first memory for controlling the storing of digital signals received by said first memory from said converting means and for identifying the digital signals indicative of the plurality of picture elements with respect to digital signals indicative of vertical and horizontal edges of the bank note and for delimiting said digital signals to be stored to signals representative of a preselected window of picture elements selected with respect to horizontal and vertical edges;

means, coupled to said first memory, for comparing said signals stored in said first memory with reference signals representative of a corresponding window of picture elements of reference bank notes; and means, coupled to said comparing means for evaluating the result of said comparing means and for rendering a decision of whether to accept or reject said detected bank note.

7. An arrangement according to claim 6, wherein said comparing means comprises a second memory for storing a library of reference sets of information representative of each of a plurality of bank notes to be checked and of front and back sides thereof and with respect to two possible positions.

8. An arrangement according to claim 6, wherein said comparing means comprises means for generating a comparison signal and for weighting parts of said comparison signal, and means for filtering out insignificant errors in said comparison signal.

9. An arrangement according to claim 8, wherein said filter coupled between said converting means and said first memory, for filtering out insignificant digital data signals from being received by said first memory.

* * * * *